(No Model.)
C. F. STEWART.
APPARATUS FOR MANUFACTURING DOWEL PINS.
No. 435,463. Patented Sept. 2, 1890.
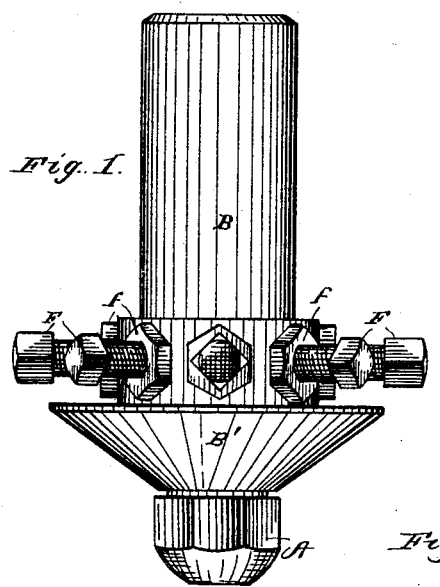
Fig. 1.
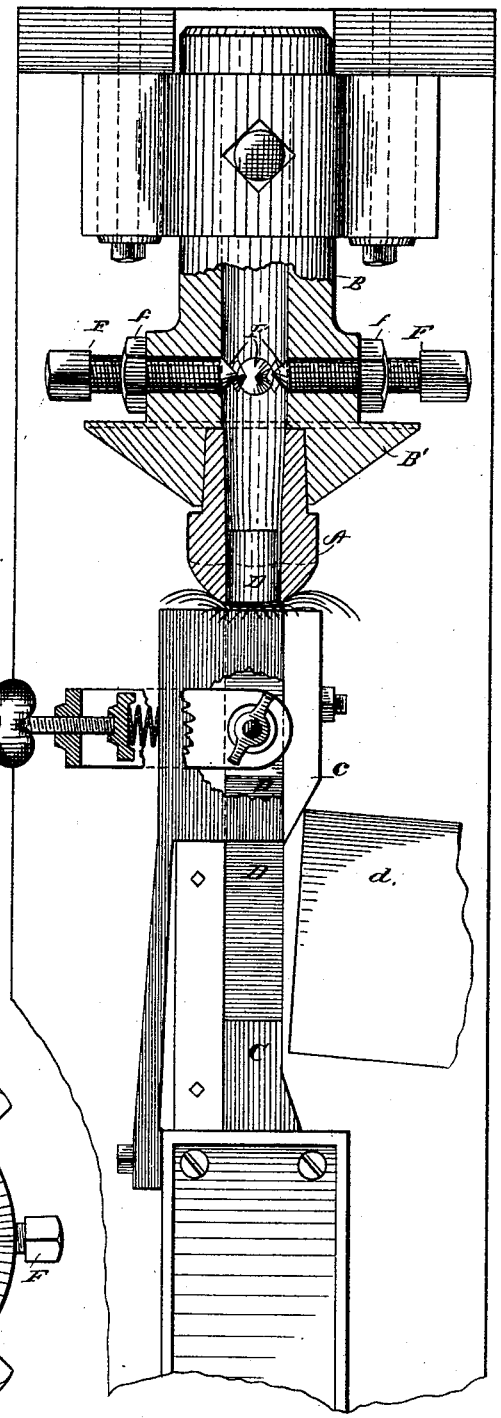
Fig. 2.
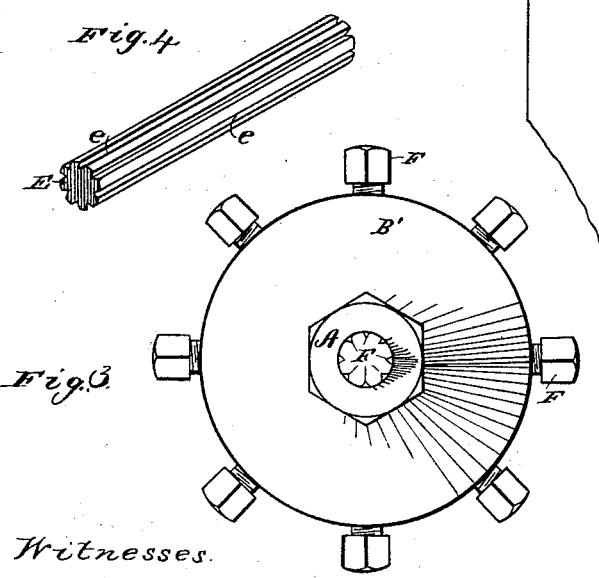
Fig. 3.
Fig. 4.
Witnesses.
W. R. Edelen,
Will B. Sage.
Inventor.
Clarence F. Stewart
By Leggett & Leggett
Attys.

UNITED STATES PATENT OFFICE.

CLARENCE F. STEWART, OF NORWALK, OHIO.

APPARATUS FOR MANUFACTURING DOWEL-PINS.

SPECIFICATION forming part of Letters Patent No. 435,463, dated September 2, 1890.

Application filed February 15, 1890. Serial No. 340,551. (No model.)

*To all whom it may concern:*

Be it known that I, CLARENCE F. STEWART, of Norwalk, in the county of Huron and State of Ohio, have invented certain new and useful Improvements in Apparatus for Manufacturing Dowel-Pins; and I do hereby declare the following to be a full, clear, and exact description of the invention, such as will enable others skilled in the art to which it pertains to make and use the same.

My invention relates to improvements in apparatus for manufacturing dowel-pins; and it consists in certain features of construction and in combination of parts hereinafter described, and pointed out in the claims. A dowel-pin should of course fit snugly into the hole of the work into which it is driven, and the dowel-pins are usually first dipped in glue, and by reason of the snug fit the glue is mostly or entirely scraped off. Hence in practice either a loose-fitting dowel-pin must be used, or else the gluing is likely to be defective. In view of these difficulties I have devised mechanism for manufacturing dowel-pins whereby and at the same operation a series of small grooves are made in the dowel-pin lengthwise thereof for retaining the glue, by means of which a tight-fitting dowel-pin may be used, meantime the grooves thereof retaining sufficient glue to firmly cement the dowel-pin in the work.

In the accompanying drawings, Figures 1 and 2 are plans, the latter being partly in section. Fig. 3 is a front elevation of the die and attachments. Fig. 4 is a view in perspective of the finished work or dowel-pin.

This machine is designed as an improvement on mechanism shown and described in United States Letters Patent No. 351,292, granted to me October 19, 1886, and to which reference is hereby made.

A represents the die, and B the hollow die-holder, the latter terminating at the forward end thereof in a broad conical head B'.

C is a reciprocating plunger for driving the blank through the die.

D represents a blank cut from a strip of wood $d$ by the action of plunger C and stationary knife $c$, each successive blank forcing the next preceding blank through the die.

E is the finished dowel-pin, the same having a series of slight longitudinal grooves $e$, and for cutting these grooves during the passage of the pin through the machine I provide as follows: The die-holder B just back of head B' is provided with a series of screw-threaded radial holes for receiving cutters F. These cutters are essentially pointed steel set-screws and are screwed into the die-holder until the points thereof protrude into the cavity or bore of the die-holder. Each cutter F is provided with a lock-nut $f$ for holding the cutter in adjustment. The point of each cutter may be conical or of any other form desired, according to the form of groove that is to be cut. These cutters could be otherwise secured, but the screw-threaded feature thereof, as aforesaid, is convenient and cheap, and therefore preferred to other more expensive devices for the purpose. The conical head B' wards off or deflects the splinters and cuttings from the blank, so that these do not clog in the heads of the cutters. As the shaping of the dowel-pin by being forced through the die and the cutting of groove $e$ is all done by passing the dowel-pin once through the machine, the cutting of these grooves does not increase the cost of manufacturing the dowel-pins; but such grooved dowel-pins will be found of superior quality for the reasons aforesaid.

The construction of the apparatus may be more or less varied without departing from the purpose and spirit of my invention. For instance, the grooving-tools could be attached to the head of the die, or could be attached to a separate block or support other than the die-holder and located rearward of the latter, and in either case, so long as the grooving was done by the action of the plunger in forcing the blanks and dowel-pins through the machine, the result would be the same. The construction shown, however, is preferable for various reasons, among which may be mentioned cheapness and convenience.

What I claim is—

1. In apparatus for manufacturing dowel-pins, the combination, with die, hollow die-holder, and tool for grooving the dowel-pin, substantially as indicated, of a conical head of the die-holder, such conical head being located between the die and the cutters of the machine, substantially as set forth.

2. In apparatus for manufacturing dowel-pins, the combination of a die, grooving tools or cutters located behind the die-head and adapted to engage and groove the dowel-pins lengthwise during their passage through the machine, and a plunger for forcing the blanks through the die and between the grooving or cutting tools, substantially as set forth.

In testimony whereof I sign this specification, in the presence of two witnesses, this 27th day of January, 1890.

CLARENCE F. STEWART.

Witnesses:
  C. H. DORER,
  WILL B. SAGE.